Dec. 11, 1923.
W. DANLEY
RAT TRAP
Filed Sept. 21, 1921
1,477,320
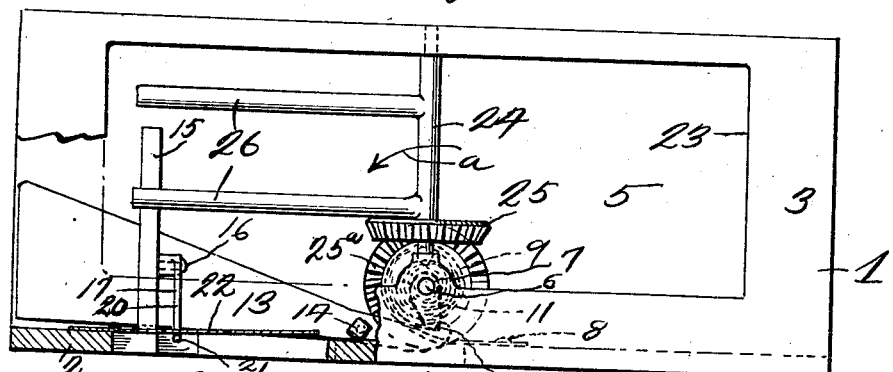
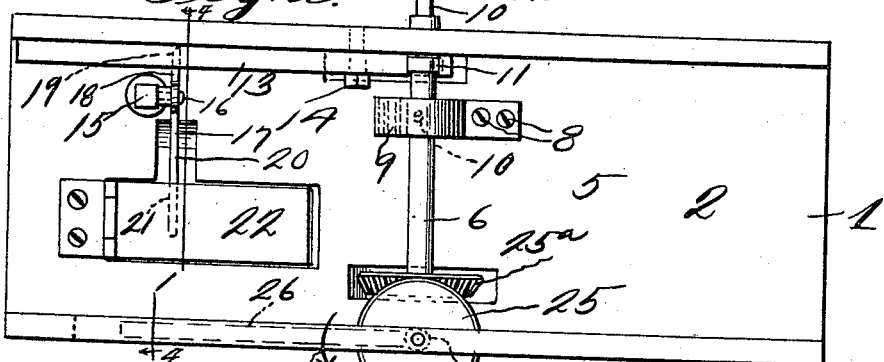
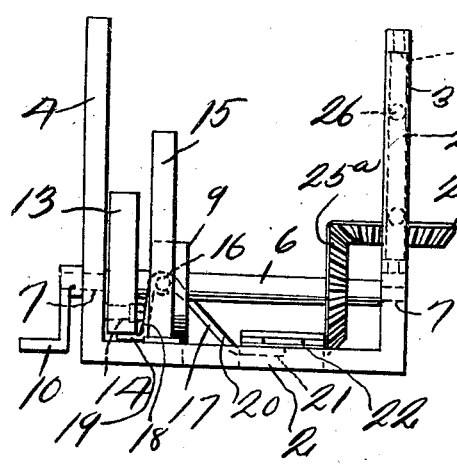
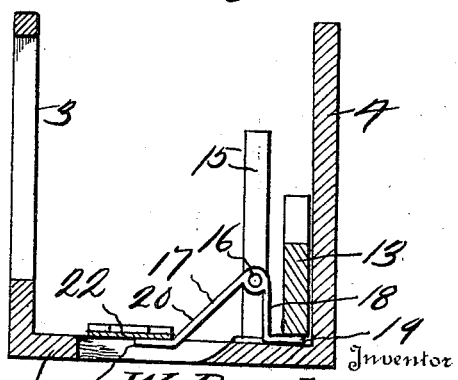
Inventor
W. Danley
By *D. Swift*
Attorney Patented Dec. 11, 1923.

1,477,320

UNITED STATES PATENT OFFICE.

WILLIAM DANLEY, OF CHARLESTON, TEXAS.

RAT TRAP.

Application filed September 21, 1921. Serial No. 502,164.

*To all whom it may concern:*

Be it known that I, WILLIAM DANLEY, a citizen of the United States, residing at Charleston, in the county of Delta, State of Texas, have invented a new and useful Rat Trap; and I do hereby declare the following to be a full, clear, and exact description of the invention, such as will enable others skilled in the art to which it appertains to make and use the same.

The invention relates to rat traps and has for its object to provide a device of this character which is spring actuated and provided with a spring actuated animal engaging member, which member when the trap is tripped engaging the rat with considerable force, kills the rat and projects the rat through the air to a point remote from the trap. Also to so construct the trap that one winding of the trap will operate the same a plurality of times thereby allowing the trap to be continuously used.

A further object is to provide a rat trap comprising a casing, said casing having rotatably mounted therein a shaft, which shaft is geared to a rotatable animal engaging member, said shaft being held against movement under the impulse of a spring by a detent, which detent is tripped by the animal.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the trap, parts being broken away.

Figure 2 is a top plan view of the trap.

Figure 3 is an end elevation of the trap.

Figure 4 is a vertical transverse sectional view through the trap taken on line 4—4 of Figure 2.

Referring to the drawings, the numeral 1 designates the casing of the trap, which casing comprises a bottom 2 and the side walls 3 and 4. Extending transversely of the chamber 5 of the casing 1 is a horizontally disposed shaft 6, which shaft is rotatably mounted in bearings 7 of the sides 3 and 4 of the casing. Secured to the bottom 2 by means of screws 8 is a spiral spring 9, the inner end of which is secured at 10 to the shaft 6, said spiral spring when tensioned causes the shaft 6 to be rotated in the direction of the arrow *a*. One of the ends of the shaft 6 is provided with a crank 10 by means of which crank the spring 9 may be tensioned and held in tensioned position by means of a lug 11, which extends downwardly from one end of the shaft 6, and engages the shoulder 12 carried by the inner end of a weighted lever 13, which lever is pivoted at 14 to the side 4 of the casing. It will be seen that when the rear end of the lever is raised, that the lug 11 will be released thereby allowing the shaft 6 to rotate under the influence of the spiral spring 9, and that as the lug 11 moves around in the direction of the arrow *a*, it will again be engaged by the shoulder 12 and the rotation of the shaft 6 stopped.

Extending upwardly from the bottom 2 of the casing adjacent the outer end of the lever 13 is a bracket 15, to the inner face of which bracket is pivotally connected at 16 a bell crank lever 17. One end of the arm 18 terminates in a horizontally disposed portion 19 engaging under the outer end of the lever 13 while the other arm 20 of the bell crank lever 17 terminates in a horizontally disposed arm 21, which engages under a hinged tripping plate 22, on which plate bait may be disposed for attracting the animal to a position where it will place its feet on the tripping plate 22, thereby rocking the bell crank lever 17 on its pivotal point 16 and consequently causing the outer end of the tripping lever 13 to be raised, thereby releasing the shaft 6 and allowing the same to make a complete revolution before again being stopped. It is to be understood though, as long as the animal remains on the plate 22 that the spring actuated shaft 6 will continue to rotate under the influence of the spiral spring 9. The wall 3 of the casing 1 is provided with an opening 23, in which opening is pivotally mounted a vertically disposed shaft 24, said shaft at its lower end is provided with a gear 25 which meshes with a gear 26 carried by the shaft 6. It will be seen that as the shaft 6 rotates that the vertically disposed shaft 24 will rotate in the direction of the arrow *b*, thereby causing the animal engaging arms 26 which are horizontally disposed and carried by the shaft 24 to rotate at great speed under the influence of the spiral spring 9, and as they rotate to engage the animal with terrific force, thereby killing the animal and projecting the dead body through the air through the opening 23 in the side 3 of the casing to a point remote from the trap. It has been found that where traps capture the animal alive, impale the animal or kill the animal without removing the animal or its body from the trap to a point remote from the trap that other animals will not approach the trap, therefore it will be seen that a trap is provided which will not only kill the animal, but will remove the body from adjacent the trap.

It is to be understood that a tub of water or a receptacle may be disposed adjacent the trap and into which tub of water or receptacle the body of the animal may be projected.

The invention having been set forth what is claimed as new and useful is:—

A trap comprising a casing, a tripping platform disposed within the bottom of said casing, a transversely disposed rotatable shaft adjacent one end of said tripping platform and horizontally disposed, a detent lever pivoted to the casing and cooperating with a lug on said transversely disposed shaft for holding said shaft, a coiled spring for normally rotating said shaft, which coiled spring is held tensioned by the detent lever, a vertically disposed shaft rotatably mounted in bearings adjacent one end of the transversely disposed shaft and gear thereto, animal engaging arms carried by the vertically disposed shaft and adapted to rotate in a plane above the tripping platform and a rockable arm actuated by the tripping platform for raising the free end of the detent lever in such a manner as to allow the transversely disposed shaft to revolve as long as there is weight on the tripping platform.

In testimony whereof I have signed my name to this specification in the presence of two subscribing witnesses.

WILLIAM DANLEY.

Witnesses:
G. P. CLICK,
R. B. STELL.